Sept. 12, 1961     L. HELLER ET AL     2,999,945
PROCESS OF AND APPARATUS FOR COOLING ELECTRICAL GENERATORS
Filed Dec. 10, 1958
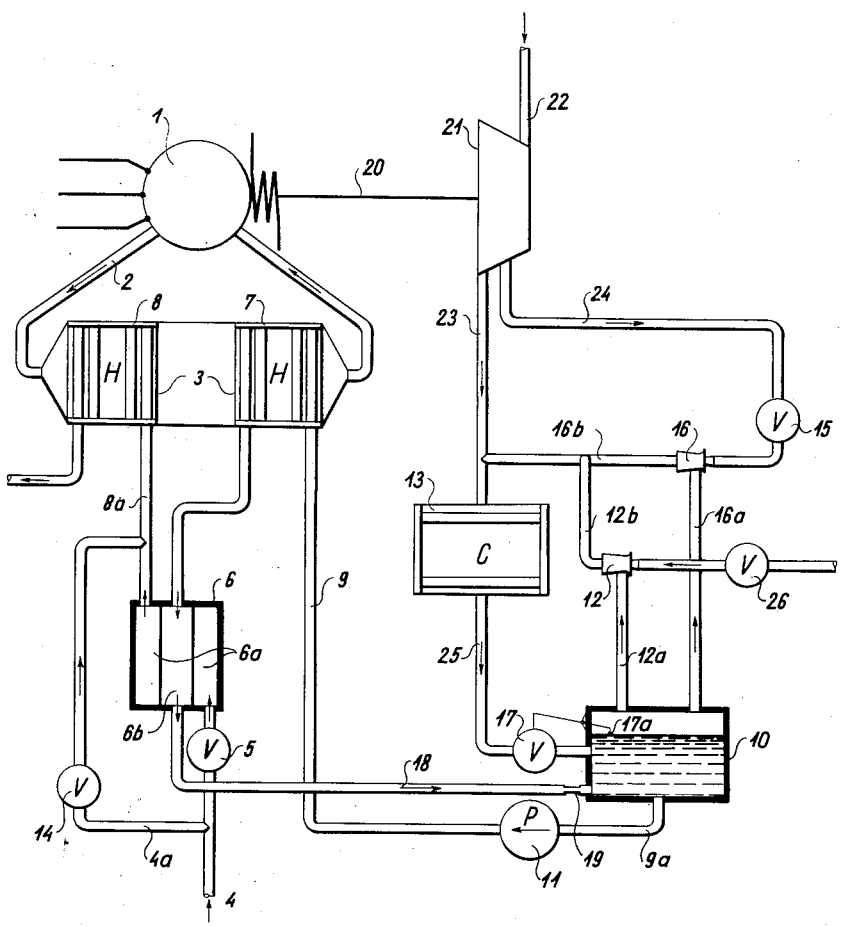
INVENTORS
LASZLO HELLER
ARPAD BAKAY United States Patent Office 2,999,945
Patented Sept. 12, 1961

2,999,945
PROCESS OF AND APPARATUS FOR COOLING ELECTRICAL GENERATORS
László Heller and Árpád Bakay, Budapest, Hungary, assignors to Licencia Talalmanyokat Ertekesito Vallalat, Budapest, Hungary
Filed Dec. 10, 1958, Ser. No. 779,475
Claims priority, application Hungary Dec. 14, 1957
12 Claims. (Cl. 290—2)

This invention relates to a process of and apparatus for cooling electrical generators.

It is an important object of the present invention to provide a process of and means for cooling electrical generators with maximum efficiency and in such a manner that the output of such generators is considerably enhanced.

Another object of the present invention is the provision of means enabling such cooling to be effected by two distinct cooling systems acting either jointly or independently of one another.

Still another object of the present invention is the provision of a multi-system cooling arrangement for electrical generators which is inexpensive to construct and maintain as well as highly economical in operation, thereby reducing the costs of operation of the entire power plant constituted by such generators.

More particularly, it is known that the output of an electrical generator is limited by the maximum temperature attained by the generator body as determined by the maximum temperature of the cooling medium employed therewith. One method heretofore utilized for the purpose of reducing the temperature of this cooling medium is what is commonly called "natural cooling," which comprises passing the cooling medium (usually a gas) through a heat exchanger in which it is placed in heat exchange relationship with water or a similar natural liquid coolant, the water thus extracting the heat from the cooling medium. It has further been proposed that, if the available natural cooling is insufficient and does not allow the generator to be operated at its rated maximum load, as, for instance, in the case of excessively warm cooling water, the temperature of the gaseous cooling medium be reduced by what may be called "artificial cooling" and comprises subjecting the heated cooling medium to the action of a refrigerating machine employing a conventional refrigerant cooled by evaporation in the refrigerating machine.

Such temperature reducing methods, however, though they solve the problem technically, cannot be carried out in practice in an economical manner. With artificial cooling processes, both of the compression and absorption type, the use of foreign substances serving as the refrigerant, such as ammonia, Freon compounds, etc., is, because of their disagreeable and dangerous properties, undesirable in the power plant. Moreover, even where an entirely harmless substance is used as the refrigerant, the cooling equipment as such is a technical installation completely distinct from the power plant and in all circumstances calls for separate personnel for handling and supervision while in its operation and primarily in its capital costs it involves a considerable expenditure of money.

The provision of a cooling system technically suitable and economical in operation is all the more important because it would not only solve the question of the generator yielding its entire rated output even with an excessive warming up of the cooling water, but also would render possible the attainment of the long-sought goal of the maximum output of a power station being limited in effect only by the limit output of the generators.

These problems are solved in accordance with the present invention by employing a steam jet ejector-actuated cooling installation or refrigeration machine in such a way that the drawbacks enumerated above and common to all kinds of cooling machines are eliminated, while at the same time the requisite economy in operation is assured. As is evident, the operating medium of a steam jet ejector-actuated cooling machine is steam, which is not a foreign and unusual substance in power stations on the one hand, and the operation of which is simple and not unusual for the power station staff on the other hand. The present invention is not subject to the disadvantage of requiring a considerable investment cost, which might affect the economy of the project in its conventional form, due to the fact that the steam jet ejector cooling equipment is used in such a way that this disadvantage is greatly reduced while all of the advantages attendant such an arrangement as described above are retained.

The high investment costs, representing the normally decisive drawback, are overcome according to the present invention by virtue of the fact that the condenser of the refrigerating or cooling machine, representing a considerable part of the investment cost, together with its deaerating equipment, are omitted, the already installed condensing equipment of the steam turbines used for powering the generators being employed simultaneously as the cooling machine condenser. The economy of the arrangement according to the present invention is further enhanced by the fact that the working medium of each jet ejector is steam taken from an existing bleeding point of the associated steam turbine, that is, exhaust steam which has already been used for other work.

Thus the artificial cooling plant as aforesaid is characterized by the following advantages:

(1) Its operating medium is water-steam, which is identical with the working medium of the power station prime movers, say turbines;

(2) The equipment does not necessitate additional supervision or handling;

(3) Its investment costs amount to merely a small part of the expenditure of a conventional steam ejector-actuated cooling or refrigerating machine; and finally (4) The operation with exhaust steam taken from the turbines, together with point 3, ensures an increased economy for the entire system.

The features so far enumerated serve merely for the application of the most suitable cooling equipment in the most economical manner. The economy of the whole system is, however, favorably influenced still further by the manner according to which the artificial cooling equipment is connected to the heat exchanger in which the cooling gas circulated through the generator is cooled and also by the particular heat exchanger construction employed. It would be altogether wrong to dissipate the whole quantity of loss heat, to be extracted from the generator, through the artificial cooling machine, or else, to recool all of the natural cooling water circulating in the heat exchanger by the artificial cooling machine. Since the temperature of the gaseous cooling medium leaving the generator, at all times and in all circumstances, exceeds that of the cooling water, the initial reduction of the temperature of the cooling medium down to a certain value should always be effected by the cooling water itself, and only the further cooling of the gaseous cooling medium should be effected by the artificial cooling machine.

The realization and implementation of this latter point makes necessary the division of the said heat exchanger into two parts. Through one of these parts only the natural cooling water will flow, while through the second part only refrigerant condensate cooled either by the natural cooling water or by evaporation will flow.

It is also contemplated, in accordance with the present invention, that under certain circumstances even that part of the heat of the generator cooling gas flowing through the part of the heat exchanger normally traversed by the refrigerant condensate be absorbed by the natural cooling water. As will be understood, the condensate circulated through this part of the heat exchanger is condensate of boiler feed water quality inasmuch as the steam jet compressor system for the refrigerating machine operates with the same medium as is circulated in the turbine boiler system. If, then, raw natural cooling water were to flow from time to time in this part of the heat exchanger, during changeovers there could arise some sedimentation in the heat exchanger which might subsequently contaminate the condensate, a result which, especially in modern power stations, is not permissible.

For the elimination of this potential defect, the system according to the present invention contemplates the provision of a separate auxiliary cooling device or heat exchanger in such a way that in the aforesaid heat exchanger part only condensate of feed water purity is circulated which, after leaving the heat exchanger, returns to the refrigerating machine through the above-mentioned auxiliary cooling device. The natural cooling water which always flows through the other part of the heat exchanger is permitted to flow thereto either through a conduit of the said auxiliary cooling device which is in heat exchange relationship with the conduit thereof through which the condensate flows, or through another conduit which bypasses the said auxiliary cooling device, suitable valves being provided to direct the flow of the natural cooling water as desired. Thus, in cases when there is no need for artificial cooling, the refrigerating machine is cut out of operation and only its circulating pump circulates the condensate between the evaporator of the refrigerating machine and the heat exchanger. In such cases, all the steam jet ejectors are out of operation and only the deaerating pump of the evaporator is in action, maintaining the vacuum which corresponds to the saturation value belonging to the actual temperature of circulated condensate. Concurrently, the fresh cooling water is directed by proper setting of the respective valves to flow through its assigned conduit of the auxiliary cooling device, whereby, before entering into the heat exchanger, it extracts from the circulated condensate the heat absorbed by the latter from the gaseous cooling medium in the main heat exchanger. In this manner, contamination of the condensate of the refrigerant is absolutely prevented, and the loss heat of the generator will, of course, effectively be drained entirely by the cooling water.

Still further, the economy of the structure of the whole system is determined by the proportion of the two parts of the main heat exchanger. It is obvious that if the artificially cooled part thereof, i.e., that part through which only the refrigerant condensate flows, is made too small, the required cooling output may be attained only at a very low evaporation level which, again, results in a quick rise in the operation costs of the cooling machine. If, on the other hand, this part of the main heat exchanger is too large, it enables the dissipation of the whole loss heat by natural cooling only at a much lower cooling water temperature on the one hand (or else, calls for a larger main exchanger), and requires an increase in the size of the auxiliary cooling device or heat exchanger on the other.

For the purpose of implementing the principles of the present invention, therefore, the proper proportioning of the surface parts of the main heat exchanger is of great importance. The proper ratio is determined by the various operating conditions of the generator, the temperature conditions of the cooling water, and by various external circumstances. The characteristic feature of the equipment according to the present invention is that the optimum economical proportion always rests between the limits of 25% and 45%, which percentage values are to be understood to represent the percentages of the generator loss heat. A 30% division, for instance, means that the part of the heat exchanger through which the condensate flows will dissipate 30% of the entire loss heat, i.e., the heat to be extracted from the generator.

The foregoing objects, characteristics and advantages of the present invention will be more fully understood from the following detailed description thereof when read in conjunction with the accompanying drawing, the sole figure of which is a schematic and diagrammatic illustration of a generator cooling system according to the invention.

Referring now to the drawing in detail, a power station is schematically indicated by a generator 1, the rotor of which is driven through the intermediary of any suitable means 20 by a steam-driven turbine 21 provided with a steam inlet conduit 22, a main steam outlet conduit 23, and an auxiliary steam outlet conduit 24 the function of which will be more fully explained hereinafter. The generator is adapted to be cooled by any suitable gaseous cooling medium, such as air, hydrogen or the like, although it is possible to employ liquid cooling media. The cooling medium is circulated through the generator by means of a conduit 2 which may be equipped with suitable pumps (not shown). An intermediate portion of the conduit 2 passes through a main heat exchanger 3 where it is in heat exchange relationship with two conduits 7 and 8, shaped as coils or the like, the conduit 8 thus being located in the "hot" part of the heat exchanger and the conduit 7 in the "cold" part of the heat exchanger.

In accordance with the principles of the present invention, there is provided an auxiliary heat exchanger generally designated 6 and comprising two preferably coil-type conduits 6a and 6b in heat exchange relationship with one another. The conduit 6a communicates via a conduit 8a with the coil 8 of the main heat exchanger 3 and via a valve 5 with a feed conduit 4. In advance of the valve 5, the feed conduit 4 branches into a conduit 4a controlled by a valve 14, the conduit 4a bypassing the conduit or coil 6a and communicating with the conduit 8a. The conduit 4 conducts only fresh water to effect the natural cooling referred to hereinabove.

The conduit or coil 6b of the auxiliary heat exchanger 6 communicates with the main heat exchanger coil or conduit 7 and with a conduit 18, the latter being provided with a throttle member 19 and connected to the evaporator 10 of a refrigerating machine. A conduit 9 leads from the heat exchanger coil 7 to a pump 11 which communicates via a conduit 9a with the base of the evaporator 10. A conduit 25 is connected to the evaporator adjacent the top thereof, a valve 17 controlled by a float 17a responsive to the level of the refrigerant in the evaporator 10 being incorporated in the conduit 25. The other end of the conduit 25 is connected to the condenser 13 associated with the steam turbine 21 and communicating therewith through the aforesaid main steam outlet conduit 23.

An ejector 12, operated by steam flowing thereto via a conduit 24a (connected, for example, to the auxiliary steam outlet conduit 24) provided with a shut-off valve 26, communicates with the top of the evaporator 10 through a line 12a and with the condenser 13 through a line 12b, thereby serving to vent or deaerate the evaporator to the condenser. A second ejector 16, operated by steam from the conduit 24 which is provided with a shut-off valve 15, communicates with the top of the evaporator 10 through a conduit or line 16a and with the condenser 13 through a conduit 16b.

The operation of the system according to the present invention, therefore, is as follows:

In the event only natural cooling is desired, the valve 14 is closed and valve 5 opened to admit cold water from conduit 4 into the auxiliary heat exchanger coil 6a. The valve 15 is closed, deactuating ejector 16, but valve 26 remains open. The refrigerant condensate is circulated from evaporator 10 through the main heat exchanger coil 7 and the auxiliary heat exchanger coil 6b, in countercurrent flow to the water in coil 6a, by the pump 11.

The heat produced in the generator 1 is extracted and absorbed by the cooling gas flowing through conduit 2. This cooling medium, upon reaching the heat exchanger 3, yields its accumulated heat in succession to the water in coil 8 and to the condensate in coil 7 and then, recooled, returns once more into the generator. At the same time the fresh cooling water 4, which is flowing through the auxiliary cooling coil 6a, first cools the condensate arriving from the cold-side heat exchanger part 7 and then enters the warm-side heat exchanger part 8 from which it leaves after warming up to its final temperature. Thus, substantially all the loss heat absorbed by the cooling medium in the generator is ultimately absorbed by the cooling water coming from conduit 4. The condensate, which entered the coil 7 via conduit 9, flows from the cold-side heat exchanger part through the auxiliary heat exchanger coil or surface 6b back into the evaporator 10 of the cooling machine after dissipating its acquired heat to the water in the coil 6a, while the ejector 12 serves for the deaeration of the evaporator 10 toward the condenser 13 of the steam turbine 21. The heat exchange between the water and condensate is necessary since, during natural cooling, the refrigerating machine is inoperative, whereby no cooling of the condensate by evaporation takes place in the evaporator 10.

If, either due to an unexpectedly increased load or to an excessive rise in the temperature of the cooling water, the temperature of the gas cooling the generator should exceed a permissible maximum, the system is switched over to artificial cooling. This is effected by first closing valve 5 of the cooling water conduit 4 leading into the auxiliary cooling coil 6a and opening the valve 14 leading into the bypass pipe 4a. The cooling water thereby bypasses the auxiliary cooling coil 6b and enters the warm-side 8 of the main heat exchanger 3 while still at its initial temperature. At the same time, the circulating condensate passes through the auxiliary cooling coil or surface 6b, but, since the other part of the auxiliary heat exchanger is cut out, it does not cool down prior to its entry into the evaporator 10 of the cooling machine, arriving there still at its elevated temperature. Simultaneously, by the opening of the valve 15 inserted in the auxiliary outlet or bleeding pipe 24 of the turbine, the steam jet ejector (or ejectors) 16 is set into operation, whereby the vapors are compressed and pumped from the evaporator into the condenser 13 in which both the working steam for the ejector and also the refrigerant vapors are condensed. Since, therefore, a part of the circulated condensate evaporates, the condensate itself will cool off to the requisite temperature at which, by means of the circulating pump 11, it is returned into the heat exchanger coil 7. At the same time, for the purpose of compensating for the condensate extracted from the evaporator, water is admitted through the float-controlled valve 17 into the evaporator 10 from the condenser 13.

In order to prevent air from contaminating the circulated condensate, due to possible leakage, even in parts outside the evaporator, the throttling disc 19 or some other suitable device is inserted into the returning condensate pipe 18 close to its inlet into the evaporator, whereby the pressure of the circulated condensate, from the pressure side of the circulating pump 11 to the throttling device 19, will remain slightly above atmospheric.

From the foregoing it will be appreciated that, in accordance with the present invention, steam which has been partly used in driving the turbine is bled from the latter via the conduit 24 for the purpose of operating the steam ejector or ejectors 16 of the refrigerating machine employed when artificial cooling of the gaseous generator cooling medium is required. Thus, the energy needed is supplied by the same source which powers the turbine (or turbines) of the power station, as a consequence of which the overall operating costs of the plant are materially reduced, as already mentioned hereinabove. Moreover, the deaeration of the refrigerating machine is effected by the deaerating apparatus of the condenser of the steam turbine, namely the ejector 12. The fact that the ejector 12 is always in operation, i.e., both during natural and artificial cooling, has no appreciable adverse effect on the economy of the system, since this ejector is an apparatus of very small output and thus consumes only minor quantities of steam.

Although the present invention has been described with reference to a preferred embodiment thereof, it is understood that this disclosure is for the purpose of illustration only and that various omissions and changes in shape, proportion and arrangement of the parts, as well as the substitution of equivalent elements for the arrangements shown and described, may be made without departing from the scope of the invention as set forth in the appended claims.

Having thus particularly described the invention, what is claimed and desired to secure by Letters Patent is:

1. The process of cooling an electrical generator, comprising the steps of circulating a cooling medium through said generator, passing said cooling medium, when heated by said generator, in heat exchange relationship first with natural cooling water and then with a refrigerant condensate, and artificially cooling said condensate prior to reuse thereof for further cooling of additional quantities of said heated cooling medium, said last-mentioned step comprising passing the condensate, after heating thereof by said cooling medium, in heat exchange relationship with said natural water prior to the arrival of the latter in heat exchange relationship with said cooling medium.

2. The process of claim 1, wherein said heated condensate and said natural cooling water when in heat exchange relationship with one another flow countercurrent to each other.

3. The process of cooling an electrical generator driven by a steam turbine having a condenser for exhaust steam, comprising the steps of circulating a cooling medium through said generator, passing said cooling medium, when heated by said generator, in heat exchange relationship first with natural cooling water and then with refrigerant condensate drawn from an evaporator of a refrigerating machine, returning the heated condensate to said evaporator, supplying partly used steam bled from said turbine to a steam jet ejector to thereby extract some refrigerant vapors from said evaporator so as to cause evaporation of some of said condensate in said evaporator and consequent cooling of the remaining condensate, and returning said cooled condensate into heat exchange relationship with additional quantities of said heated cooling medium.

4. Apparatus for cooling an electrical generator driven by a steam turbine having a condenser for exhaust steam, comprising a main heat exchanger for placing the generator cooling medium in heat exchange relationship sequentially with natural cooling water and with refrigerant condensate, an auxiliary heat exchanger for placing heated condensate leaving said main heat exchanger into heat exchange relationship with said natural cooling water prior to entry of the latter into said main heat exchanger, conduit means bypassing said auxiliary heat exchanger to permit flow of said condensate from said main heat exchanger out of heat exchange relationship with said cooling water, an evaporator connected to the condensate outlet of said auxiliary heat exchanger, pump means for circulating said condensate from said evaporator through said main and auxiliary heat exchangers and back to said evaporator, first steam jet ejector means connected to said evaporator and operable by partly used exhaust steam from said turbine to effect evaporation of condensate in said evaporator and to pass some of the resultant vapors into said condenser, and second steam jet ejector means for deaerating said evaporator to said condenser.

5. Apparatus according to claim 4, further comprising shut-off valve means controlling the inlet to said first ejector means for rendering the same inoperative if no evaporation of condensate in said evaporator is to take place.

6. Apparatus according to claim 4, said auxiliary heat exchanger comprising a pair of coils for conducting said water and said condensate, respectively, said conduit means bypassing the water-conducting coil of said auxiliary heat exchanger, and shut-off valve means controlling the inlets to said water-conducting coil and said conduit means, respectively.

7. Apparatus according to claim 4, said main heat exchanger comprising a conduit for conducting said generator cooling medium, and a pair of individual coils for conducting said cooling water and said condensate, respectively, said coils being in heat exchange relationship only with said conduit.

8. Apparatus according to claim 7, said auxiliary heat exchanger comprising a pair of coils for conducting said water and said condensate, respectively, the water-conducting coil of said auxiliary heat exchanger being connected only to the water-conducting coil of said main heat exchanger, the condensate-conducting coil of said auxiliary heat exchanger being connected only to the condensate-conducting coil of said main heat exchanger, said conduit means bypassing said water-conducting coil of said auxiliary heat exchanger, and shut-off valve means controlling the inlets to said water-conducting coil of said auxiliary heat exchanger and said conduit means, respectively.

9. Apparatus according to claim 4, further comprising a return conduit leading from said condenser to said evaporator, and float-controlled valve means in said return conduit, whereby condensed steam and condensate may be admitted to said evaporator from said condenser to compensate for condensate extracted from said evaporator by said first steam jet ejector means.

10. Apparatus according to claim 4, further comprising throttle means interconnected between the outlet of said auxiliary heat exchanger and the inlet of said evaporator.

11. Apparatus according to claim 4, said main heat exchanger comprising a pair of individual coils for conducting said cooling water and said condensate, respectively, the structural characteristics of said condensate-conducting coil relative to those of said water-conducting coil being predetermined to ensure that when said first steam jet ejector means is inoperative the heat extracted by said condensate from said generator cooling medium amounts to between 25% and 45% of the total loss heat of said generator.

12. The process of cooling an electrical generator, comprising the steps of circulating a cooling medium through said generator, passing said cooling medium, when heated by said generator, in heat exchange relationship first with natural cooling water and then with a refrigerant condensate, and artificially cooling said condensate prior to reuse thereof for further cooling of additional quantities of said heated cooling medium, said last-mentioned step comprising evaporating a portion of said condensate in an evaporator of a refrigerating machine.

References Cited in the file of this patent

UNITED STATES PATENTS

| | | |
|---|---|---|
| 1,390,062 | Smith | Sept. 6, 1921 |
| 1,741,605 | Baumann | Dec. 31, 1929 |

FOREIGN PATENTS

| | | |
|---|---|---|
| 579,317 | Germany | June 23, 1933 |